(12) United States Patent
Stumper et al.

(10) Patent No.: US 6,713,424 B2
(45) Date of Patent: Mar. 30, 2004

(54) METHOD OF MAKING FLUID DIFFUSION LAYERS AND ELECTRODES HAVING REDUCED SURFACE ROUGHNESS

(75) Inventors: Jürgen Stumper, Vancouver (CA); John Robert Gordon, Vancouver (CA); Herwig Robert Haas, Vancouver (CA); Kelvin Keen-Ven Fong, Burnaby (CA)

(73) Assignee: Ballard Power Systems Inc., Burnaby (CA)

( * ) Notice: Subject to any disclaimer, the term of this patent is extended or adjusted under 35 U.S.C. 154(b) by 255 days.

(21) Appl. No.: 09/859,130

(22) Filed: May 16, 2001

(65) Prior Publication Data

US 2002/0187388 A1 Dec. 12, 2002

Related U.S. Application Data

(63) Continuation-in-part of application No. 09/847,461, filed on May 2, 2001.

(51) Int. Cl.[7] .......................... H01M 4/88; H01M 4/86; H01M 6/00; B05D 5/12; C23C 16/26
(52) U.S. Cl. ...................... 502/101; 429/40; 429/41; 429/42; 429/43; 429/44; 427/113; 427/115; 427/359; 427/365; 427/249.1; 427/249.2; 29/623.1; 29/623.5; 29/825; 29/874
(58) Field of Search ................ 502/101; 429/40–44; 427/115, 359, 365, 113, 249.1, 249.2; 29/623.1, 623.5, 825, 874

(56) References Cited

U.S. PATENT DOCUMENTS

| | | | | |
|---|---|---|---|---|
| 4,272,353 A | | 6/1981 | Lawrance et al. | 204/283 |
| 4,732,637 A | | 3/1988 | Dettling et al. | 156/295 |
| 5,732,463 A | * | 3/1998 | Breault et al. | 29/825 |
| 5,763,765 A | | 6/1998 | Lamont et al. | 73/40.7 |
| 5,863,673 A | * | 1/1999 | Campbell et al. | 429/44 |
| 5,885,729 A | | 3/1999 | Marchetti | 429/42 |
| 5,935,643 A | * | 8/1999 | Song et al. | 427/115 |
| 6,010,798 A | | 1/2000 | Hammerschmidt et al. | 429/30 |
| 6,060,190 A | | 5/2000 | Campbell et al. | 429/40 |
| 6,127,059 A | | 10/2000 | Kato | 429/40 |
| 6,150,047 A | | 11/2000 | Yen et al. | 429/33 |
| 2002/0041992 A1 | * | 4/2002 | Zuber et al. | 429/44 |
| 2002/0192383 A1 | * | 12/2002 | Lo et al. | 427/359 |
| 2003/0008195 A1 | * | 1/2003 | Chiem et al. | 429/40 |

FOREIGN PATENT DOCUMENTS

| | | |
|---|---|---|
| EP | 0869568 | 10/1998 |
| EP | 0928036 | 7/1999 |

* cited by examiner

Primary Examiner—Mark L. Bell
Assistant Examiner—Patricia L. Hailey
(74) Attorney, Agent, or Firm—McAndrews, Held & Malloy, Ltd.

(57) ABSTRACT

The present methods make fluid diffusion layers having reduced surface roughness. The methods used for adhering the loading material to the substrate surface can reduce the average surface roughness of the fluid diffusion layers, thereby reducing leaks in and damage to ion exchange membranes. When fluid diffusion layers and electrodes having reduced surface roughness are employed in membrane electrode assemblies, better reliability and performance are obtained. A method of calculating the surface roughness of a fluid diffusion layer may be used.

56 Claims, 3 Drawing Sheets

METHOD OF MAKING FLUID DIFFUSION LAYERS AND ELECTRODES HAVING REDUCED SURFACE ROUGHNESS

CROSS-REFERENCE TO RELATED APPLICATION(S)

This application is a continuation-in-part of U.S. application Ser. No. 09/847,461 filed May 2, 2001, entitled "Abraded Fluid Diffusion Electrode for a Fuel Cell", which is incorporated herein by reference in its entirety.

FIELD OF THE INVENTION

The present invention relates to improved methods for making fluid diffusion layers and electrodes having reduced surface roughness and methods for making membrane electrode assemblies having better reliability and performance. The methods comprise adhering at least one loading material to a porous substrate in a manner such that the surface roughness of the resulting fluid diffusion layer is reduced. The reduced surface roughness may be assessed in terms of average surface roughness ($R_a$) or by observation of infrared hot-spots detected.

BACKGROUND OF THE INVENTION

Electrochemical fuel cells convert fuel and oxidant to electricity and reaction product. Solid polymer electrolyte fuel cells generally employ a membrane electrode assembly ("MEA") comprising a solid polymer electrolyte or ion exchange membrane disposed between two electrically conductive electrodes. Such electrodes comprise a fluid diffusion layer and an electrocatalyst. The fluid diffusion layer comprises a substrate with a porous structure having voids therein. The substrate is permeable to fluid reactants and products in the fuel cell.

The electrocatalyst is typically disposed in a layer at each membrane/electrode interface, to induce the desired electrochemical reaction in the fuel cell. The electrocatalyst may be disposed as a layer on the electrode or be part of the electrode in some other way. The electrocatalyst may be disposed on the membrane instead of or in addition to being disposed on the fluid diffusion layer. The electrodes are electrically coupled to provide a path for conducting electrons between the electrodes through an external load.

Fluid reactants may be supplied to the electrodes in either gaseous or liquid form. In electrochemical fuel cells employing hydrogen as the fuel and oxygen as the oxidant, the catalyzed reaction at the anode produces hydrogen cations (protons) and electrons from the fuel. The gaseous reactants move across and through the fluid diffusion layer to react at the electrocatalyst. The ion exchange membrane facilitates the migration of protons from the anode to the cathode while electrons travel from the anode to the cathode via the external load. In addition to conducting protons, the membrane isolates the hydrogen-containing fuel stream from the oxygen-containing oxidant stream. At the cathode electrocatalyst layer, oxygen reacts with the protons that have crossed the membrane and the electrons to form water as the reaction product.

In solid polymer electrolyte fuel cells employing methanol as the fuel supplied to the anode (so-called "direct methanol" fuel cells) and an oxygen-containing oxidant stream such as air (or substantially pure oxygen) as the oxidant supplied to the cathode, methanol and water are oxidized at the anode to produce protons and carbon dioxide. Typically, the methanol is supplied to the anode as an aqueous solution or as a vapor. Gaseous or liquid reactants move across and through the fluid diffusion layer. The protons migrate through the ion exchange membrane from the anode to the cathode, and at the cathode electrocatalyst layer, oxygen reacts with the protons and electrons to form water.

In solid polymer electrolyte fuel cells, the MEA is typically interposed between two separator plates or fluid flow field plates (anode and cathode plates). The plates typically act as current collectors and provide support to the MEA. Fluid flow field plates typically have channels, grooves or passageways formed therein to provide means for access of the fuel and oxidant streams to the porous fluid diffusion layers of the anode and cathode, respectively.

The electrode is electrically conductive to provide a conductive path between the electrocatalyst reactive sites and the current collectors. Materials commonly used as substrates of electrodes or as starting materials to form substrates include carbon fiber paper, woven carbon fabric, optionally filled with carbon particles and a binder, metal mesh or gauze, optionally filled with carbon particles and a binder, and other woven and nonwoven materials.

Typical substrate materials are preformed, highly electrically conductive macroporous sheet materials, which may contain a particulate electrically conductive material and a binder. It has sometimes been found advantageous to coat, impregnate, fill, or otherwise apply porous electrically conductive substrates with materials, such as carbon or graphite materials, in order to reduce porosity or achieve some other object. The material applied to the substrate is referred to herein as "loading material." When loading material is applied to one side of a substrate to form a layer, the formed layer is frequently referred to as a "sublayer". The amount of loading material (that is, the material eventually loaded onto the substrate) in an electrode is referred to as the "loading" of loading material and is usually expressed as the mass of material per unit surface area of substrate.

A certain loading of carbon or graphite can improve MEA operational performance. However, if the loading is too high, performance is impaired by interference with diffusion of product or reactant through the fluid diffusion layer. Nonetheless, substrates having larger pores or a higher porosity tend to require higher loadings of carbon or graphite.

A substrate need not be highly electrically conductive and in fact may be an electrical insulator. Such substrates may be filled with electrically conductive materials. Electrodes that are made from filled, poorly electrically conductive webs and methods for making same are disclosed in U.S. Pat. Nos. 5,863,673 and 6,060,190, which are incorporated herein by reference.

A substrate for an electrode typically has a loading material applied to it in order to provide a supporting surface for electrocatalyst, to improve conductivity, and/or to accomplish some other objective. The loading material can be applied by any of the numerous coating, impregnating, filling or other techniques known in the art. The loading material may be contained in an ink or paste that is applied to the substrate. In a typical process for applying a loading material to substrate, the substrate has an ink applied to it, and the ink comprises carbon and/or graphite with a poreformer and a binder (for example, polytetrafluoroethylene) in aqueous solution. After this application, the substrate and the loading material applied to the substrate may or may not be subjected to compaction at an elevated pressure, such as the pressure to which the electrode may be subjected in a fuel cell stack or a higher pressure. The substrate and applied loading material are dried, with the result that the substrate is loaded to a greater or lesser extent with the loading material on its surface and/or within the voids, thus forming a fluid diffusion layer. Binder in the fluid diffusion layer is typically sintered before the electrocatalyst is applied. The final fluid diffusion layer is still permeable to fluid reactants.

U.S. Pat. No. 6,127,059 discloses a gas diffusion layer for use in a solid polymer electrolyte fuel cell that makes use of a membrane electrode assembly of the type in which a catalyst layer is formed on the surface of a solid polymer electrolyte membrane. The gas diffusion layer includes a carbon fiber woven cloth having a surface and a coating of fluororesin containing carbon black on the surface. Preferably, the coating penetrates no more than one-half, more preferably no more than one-third, the thickness of the carbon fiber woven cloth. The carbon fiber woven cloth may be pre-treated with a water-repellent fluororesin (such as polytetrafluoro-ethylene), or with a mixture of a fluororesin and carbon black, to enhance water repellency. U.S. Pat. No. 6,127,059 does not disclose or suggest the step of compacting the carbon fiber woven cloth after applying the coating of fluororesin.

Compaction has been used in other processes of loading a material upon a substrate. Compaction of the wet coated porous substrate tends to push the loading material into the substrate.

Fluid diffusion layers have been made using release materials, such as Mylar release films. In some cases, the release film has a loading material applied to one surface, and then a substrate is applied over the release film. Mylar sheets have been used as release films. This combination of substrate, loading material, and release film is dried and heated, after which the release sheet is peeled off. U.S. Pat. No. 6,127,059 discusses the use of a release sheet.

In the fabrication of membrane electrode assemblies for solid polymer fuel cells, the detection of perforations or leaks in the membrane is an important aspect of quality control because of the need during fuel cell operation to maintain fluid isolation of the fuel and oxidant streams and electrical isolation of the electrodes. A perforation in the membrane may result in fluid transfer leaks across the membrane and/or electrical contact between the electrodes, causing a short-circuit. Fluid transfer may arise even where there is no perforation, such as when the membrane thins so much that it does not adequately prevent reactants from permeating through the membrane. A leak in the membrane of a fuel cell can cause the fuel and oxidant streams to fluidly communicate and chemically react, thereby degrading the electrochemical potential of the fuel cell. Fluid communication of the fuel and oxidant streams through a leak in the membrane during fuel cell operation can also result in serious degradation of the membrane due to the combustion of the fuel in the presence of catalyst and oxygen.

Leaks in a membrane may be detected by detecting the heat generated by an exothermic reaction of a pair of reactants, which are normally substantially isolated on opposite sides of the membrane, and which contact each other and react only if there is a transfer leak present. With the use of an appropriate heat detector, such as a thermal imaging device, the location of the perforations and leaks in the membranes may be determined, as they are located at the location of the exothermic reaction. The locations of exothermic reaction as seen by a thermal imaging device are referred to as "hot-spots."

The ability to locate perforations or leaks in the membrane after fabrication of the MEA can assist in diagnosis of the cause of the perforations. Techniques for detecting perforations in membranes by detecting exothermically generated heat are disclosed in U.S. Pat. No. 5,763,765, which is incorporated herein by reference. Further, the ability to detect electrodes likely to cause perforations or leaks in the membrane of an MEA before the MEA is assembled can provide a manufacturing advantage.

General techniques useful for evaluating the roughness of a surface include qualitatively or quantitatively measuring the surface such as by optical surface analysis. A Wyko optical surface analyzer is a suitable instrument for optical surface analysis and provides a profile of the surface along a line or plane. Other techniques for surface profiling include a Surftest stylus, which has a tip that is dragged over the measured surface at light pressure (like a record needle) to give a two-dimensional surface profile.

One measure of surface roughness is the average surface roughness ("$R_a$"). $R_a$ is a standard surface profile parameter used in the surface finishing industry (see for example, the Surface Metrology Guide developed by Precision Instruments Inc., ASME B46.1-1995, ASME B46.1-1985, ISO 4287-1997, and ISO 4287/1-1984) and is defined as the area between the roughness profile of a surface and its mean line, or the integral of the absolute value of the roughness profile height over the evaluation length. Note that $R_a$ measures the profile of a section of a surface (i.e. is a two-dimensional measurement); in contrast, the "average $R_a$" relates to the three-dimensional topography of a surface and is the averaged value of a plurality of sectioned profiles of the surface. While $R_a$ values are one way to quantify surface roughness, other measurable industry standard surface profile parameters such as peak count ($P_c$) or kurtosis ($R_{ku}$) may be used, and have been found to correlate with experimental results.

SUMMARY OF THE INVENTION

Improved methods of preparing a fluid diffusion layer having reduced surface roughness are provided. An improved fluid diffusion layer is also provided. An improved method of making a membrane electrode assembly having better reliability and performance is also provided. An improved method of assessing the surface roughness of a fluid diffusion layer or an electrode is further provided.

It has been found desirable to reduce the surface roughness of a fluid diffusion layer, particularly as reflected by its average $R_a$. Several improved methods are disclosed for preparing a fluid diffusion layer comprising a substrate and a loading material adhered to the substrate. Each of these methods independently or in combinations thereof can improve surface roughness.

In one method, a loading material is adhered to the substrate by the steps of (a) applying a first loading composition comprising a first portion of the loading material to the substrate in a first applying step; and (b) applying a second loading composition comprising a second portion of the loading material to the substrate in a second applying step. The substrate and the loading material applied thereto may be compacted after one or both applying steps.

In another method, a loading material is adhered to a substrate by the steps of (a) applying a loading composition comprising a loading material to the substrate, (b) partially drying the substrate and the loading composition applied thereto in a first drying step, (c) compacting the substrate and the loading material applied thereto in a compacting step, and (d) further drying the substrate and the loading material applied thereto in a second drying step.

In yet another method, a loading material may be adhered to a substrate by the steps of (a) applying a loading composition to at least one of a substrate and a release material so that at least one coated surface is formed; (b) contacting the substrate and the release material such that the coated surface is disposed between the substrate and the release material; (c) compacting the substrate, the release material, and the loading composition in a compacting step, (d) drying the substrate, the release material, and the loading composition in a drying step, and (e) removing the release material from the substrate and the loading material.

Through the use of the foregoing methods, fluid diffusion layers having reduced surface roughness may be prepared. The fluid diffusion layers and electrodes described herein are surprising in having reduced surface roughness even with a lower average amount of loading material than conventional fluid diffusion layers.

As another aspect, a method for preparing a membrane electrode assembly for an electrochemical fuel cell is also provided. The membrane electrode assembly comprises a pair of fluid diffusion layers and an ion exchange membrane interposed between the fluid diffusion layers. Electrocatalyst is disposed at the interface of each fluid diffusion layer with the ion exchange membrane. The method comprises the steps of forming one or both fluid diffusions layers according to any of the foregoing methods, and consolidating the pair of fluid diffusion layers and the ion exchange membrane into a unitary membrane electrode assembly having two major planar surfaces.

As yet another aspect, a method for evaluating surface roughness of a fluid diffusion layer or an electrode provided. The method comprises detecting infrared hot-spots corresponding to the exothermically generated heat in a fashion similar to that described in U.S. Pat. No. 5,763,765, and calculating the average $R_a$ value of the fluid diffusion layer based upon the detecting of the infrared hot-spots.

A novel fluid diffusion layer comprises a porous substrate and a loading material adhered to the substrate, wherein the fluid diffusion layer comprises loading material in an average amount of about 3 mg/cm$^2$ or less, preferably about 2.3 mg/cm$^2$ or less, and by reduced surface roughness reflected by an average $R_a$ of less than about 13 $\mu$m, preferably less than about 10 $\mu$m. As used herein, the "average amount" refers to the mass of loading material per unit surface area of substrate. The substrate is preferably characterized prior to the application of the loading material as having a porosity of at least about 80%, an average pore size of about 30 $\mu$m or greater, and/or an average $R_a$ of about 16 $\mu$m or greater.

BRIEF DESCRIPTION OF THE DRAWINGS

FIG. 1(a) reflects a fluid diffusion layer prepared by a conventional technique, and FIG. 1(b) reflects a fluid diffusion made according to one of the present methods.

DETAILED DESCRIPTION OF PREFERRED EMBODIMENT(S)

Figure 1A:
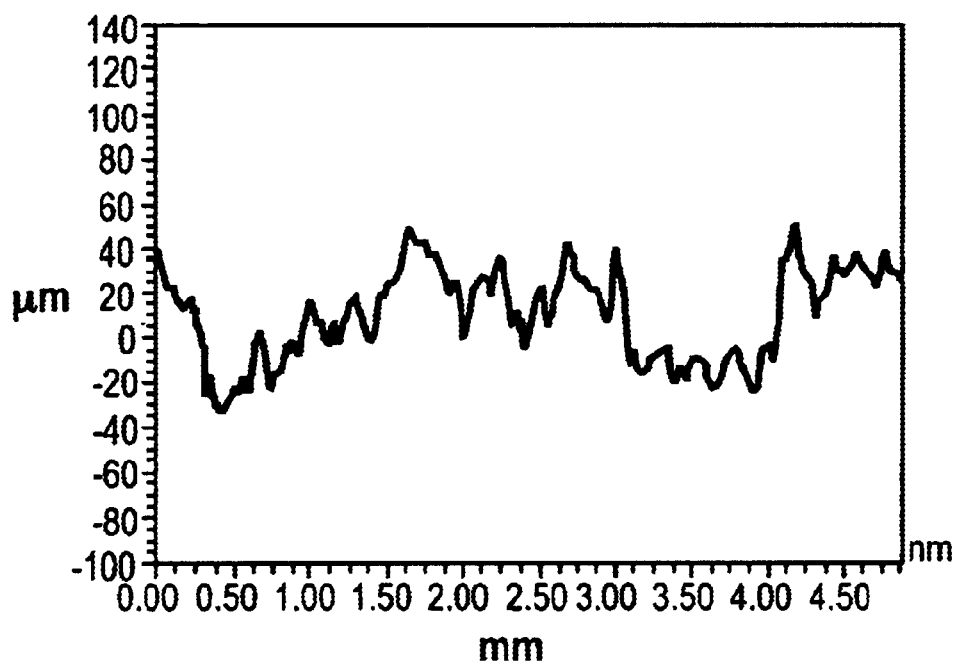
FIGS. 1(a) and 1(b) are optical analysis profiles of Grafoil™ negatives of two fluid diffusion layers.

The present methods for preparing a fluid diffusion layer comprising a substrate and a loading material adhered to the substrate yield fluid diffusion layers and electrodes having reduced surface roughness, which tends to reduce the likelihood of perforations or leaks in membrane electrode assemblies prepared from such fluid diffusion layers or electrodes. Perforations or leaks in membranes may be caused by peaks in the surface of one or both fluid diffusion layers or electrodes used to make MEAs. The fluid diffusion layers or electrodes may cause perforations or leaks by penetrating the membrane or by reducing the thickness of the membrane. Pores or depressions in the surface of the fluid diffusion layer or electrode may also cause transfer leaks, for example, as compressive stresses cause the membrane to flow into pores and other surface depressions when the MEA is heated, such as during bonding and fuel cell operation.

Thus, one potential concern for electrodes, fluid diffusion layers and the substrates used to make such layers is the degree of surface roughness. Excessive surface roughness may lead to problems, such as perforations and leaks in the membranes of the membrane electrode assemblies prepared from excessively rough fluid diffusion layers.

While not wishing to be bound by theory, it is believed that the present methods for preparing a fluid diffusion layer adhere the loading materials to a substrate such that an effective amount of loading material will remain on the surface of the substrate. The amount of loading material on the surface is effective to reduce the surface roughness of the substrate and the resulting fluid diffusion layer.

It has been found that the loading material may be less effective in reducing surface roughness if the loading material is further from the surface of the substrate. For two fluid diffusion layers having the same loading, the fluid diffusion layer having a larger proportion of loading material on the surface, as opposed to being disposed in the interior voids of the substrate, tends to have better reliability and performance.

In the present context, it is preferred to assess surface roughness by the average $R_a$ of the substrate or fluid diffusion layer. $R_a$ is a measure of the profile of a section of a surface (in other words, it is a two-dimensional measurement); in contrast, the "average $R_a$" relates to the three-dimensional topography of a surface since it is the mean of a plurality of $R_a$ values of the surface. These average $R_a$ values reflect the mean of a plurality of values, preferably 3 or more, determined by a Wyko NT2000 3-D optical Profiler or equivalent apparatus that provides results on the same scale.

Novel fluid diffusion layers may be prepared that differ structurally from prior fluid diffusion layers in that penetration of the loading material into the substrate is reduced and the surface of the substrate is coated or filled more completely with loading material. Furthermore, a smoother or more consistent surface may be obtained at a reduced average amount of loading material.

When referring to the substrate and the loading material "applied thereto" or the loading composition "applied thereto", it is contemplated that certain amounts of the loading material or loading composition which was applied in the applying step may be lost before compacting or drying as part of the normal losses associated with a manufacturing process. For example, when it is stated that the substrate and the loading composition applied thereto are compacted, it means that the substrate and applied loading composition remaining on the substrate, and not including loading composition or components thereof lost or removed as part of the process of preparing the fluid diffusion layer, are compacted. When referring to a "first" step and a "second" step, it is contemplated that other steps may be before, between, or after the first step and second step. For example, when it is stated that a method comprises a first applying step and a second applying step, the method does not exclude an earlier applying step before the first applying step or an intermediate applying step between the first and second applying steps.

In one embodiment of the present methods, a fluid diffusion layer is made by applying two loading compositions to a substrate in two or more separate applying steps. The two applying steps may be separated by an intermediate compacting step and/or a drying step, or a combination of both. The substrate and loading material applied thereto may also be subjected to a compacting step after the second applying step. Additional drying may be done after the second applying step. In some embodiments, the method comprises drying the substrate and the first loading composition applied thereto, and thereafter compacting the substrate and the loading material applied thereto. In other embodiments, the method comprises compacting the substrate and the first loading composition, and thereafter drying the substrate and the first loading composition before a second applying step.

In this embodiment, the first loading composition may comprise about 50% or more of the total loading material to be applied to the substrate, and/or the first loading composition may comprise about 75% (by weight) or less of the total loading material. Preferably, the first loading composition comprises about two-thirds of the total loading material. The second loading composition may comprise about 25% (by weight) or more of the total loading material to be applied to the substrate, and/or the second loading composition may comprise about 50% or less of the total loading material. Preferably, the second loading composition may comprise about one-third of the total loading material.

It is contemplated that different substrates may employ different relative amounts or different total amounts of loading material. Furthermore, different substrates may have different ratios of loading material in a first applying step to loading material in a second applying step that yield best results (in other words, different than two-thirds/one-third ratio that is most presently preferred for carbon fiber and graphite fiber nonwoven webs filled with a loading material comprising carbon and graphite, a binder and poreformer) when two separate applying steps are used to achieve reduced surface roughness.

The first loading material and the second loading material may comprise the same loading material (that is, the same conductive material and binder), though the loading compositions may differ in concentration and/or amount applied. Alternatively, the first and second loading compositions may be substantially identical. The first and second loading compositions may be applied using the same equipment, such as in a batch process. Alternatively, the first and second loading compositions may be applied by two different pieces of equipment, which would facilitate a continuous process.

Optionally, a release material may be used in at least one of the first applying step and the second applying step. The use of a release material is described in detail below.

In another embodiment of the present methods, a fluid diffusion layer having reduced surface roughness is made by (a) applying a loading composition comprising a loading material to a substrate, (b) partially drying the substrate and loading composition applied thereto in a first drying step, (c) compacting the substrate and loading material applied thereto in a compacting step, and (d) further drying the substrate and loading material applied thereto in a second drying step, wherein the fluid diffusion layer comprises the substrate and applied loading material after the second drying step. Step (b) can comprise drying the loading composition to moisture content of from about 30% to about 70%. For example, the step of partially drying may comprise drying until about 50% of the solvent has evaporated or drying for a predetermined time, such as about 40 minutes. This embodiment also reduces penetration of the loading material into the substrate and reduces roughness caused by shrinkage up to the time of compaction.

In yet another embodiment of the present methods, a fluid diffusion layer having reduced surface roughness is prepared by (a) applying a loading material to at least one of substrate and a release material so that at least one coated surface is formed, (b) contacting the substrate and the release material such that the coated surface is disposed between the substrate and the release material, (c) compacting the substrate, the release material, and the loading material in a compacting step, (d) drying the substrate, the release material, and the loading material in a drying step, such that the loading material is adhered to the substrate, and (e) removing the release material from the substrate and the loading material. The method may further comprise the step of partially drying after step (b), before step (c).

It has been found that the present methods of preparing fluid diffusion layers result in improved surface roughness characteristics and reduced hot-spots, as measured by infrared thermal detection, in MEAs comprising such fluid diffusion layers. While not wishing to be bound by theory, it is believed that in conventional processes of applying loading materials to a significantly porous substrate with large pores, most of the loading material penetrates the substrate upon compaction, leaving insufficient amounts on the surface. With two fluid diffusion layers having the same amount of loading material, the one with a larger percentage or amount of loading material on one surface tends to have better reliability and performance.

A first application of loading material partially fills pores and voids of the substrate and reduces penetration of a second application of loading material. Also, the partial drying of the applied loading material and substrate before compaction causes some loading material to dry and remain on the surface of the substrate. Furthermore, the application of loading material using a release material aids in adhering loading material to the substrate surface.

In the present methods, the substrate may be any substrate suitable for use as part of a fluid diffusion layer. Generally, the substrate is a paper or board-like porous material and is made of an electrically conductive material such as carbon cloth, carbon paper, carbon fiber woven, or carbon fiber nonwoven. The present methods are particularly suitable when the substrate is a carbon fiber substrate, such as a nonwoven web, characterized by an unattractive degree of surface roughness, for example, one with an average $R_a$ of greater than about 16 μm. The substrate may be selected from the group consisting of carbon fiber nonwoven substrates and carbon paper. Presently, it is preferred to employ a carbon fiber nonwoven web. However, the substrate may be any suitable porous sheet material, such as, for example, a woven fabric, a nonwoven fabric, or a mesh (a continuous sheet of substantially non-porous material that has been perforated). A hydrophobic polymer such as polytetrafluoroethylene (PTFE) is typically coated on the substrate, for example, to impart water repellency. The substrate need not be electrically conductive if the loading material will impart adequate electrical conductivity to the resulting electrode.

Indeed, the present methods broaden the range of substrates useful for electrodes. Significantly porous substrates may be used to prepare fluid diffusion layers with moderate amounts of loading material. Such substrates have a pore volume of at least about 80% and an average pore size of at least about 30 $\mu$m. For example, nonwoven webs having a porosity of about 80%, about 90%, or higher may be used, or a substrate having an average pore size of about 30 $\mu$m or larger may be used. The present methods can be used with substrates having porosity and/or pore size greater than carbon fiber paper.

Among the materials contemplated as the substrate in the present methods are carbon fiber nonwoven webs such as those available from SGL under the name SiGRACET™ Technical Fibre Products, Inc., and from Hollingsworth. Other suitable substrates are graphite fiber non-woven webs, graphitic cloth, and substrates such as those available from Textron and Spectracorp.

In the present methods, the substrate may be pre-treated so as to ultimately impart water repellency, for example, by applying a solution of a hydrophobic polymer such as polytetrafluoro-ethylene (PTFE) to the substrate and allowing it to dry overnight at ambient room conditions. The substrate may be treated in this fashion before any loading material is applied. This pre-treatment does not require sintering before any loading material is applied, but can be sintered after application of the loading material. Sintering tends to improve the water repellency of the fluid diffusion layer.

The loading material generally comprises electrically conductive material and generally improves the conductivity of the electrode and reduces porosity in addition to reducing surface roughness. Preferred components of the loading material include carbon particles, such as carbon blacks, graphite particles, and boron carbide. These and other particulate components of the loading material can be in various forms such as, for example, powders, flakes and fibers.

The loading material may further comprise electrocatalyst for promoting the electrochemical reaction in the fuel cell. The loading material may comprise some or all of the electrocatalyst to be applied to the fluid diffusion layer to form an electrode. In still other embodiments, the loading material may comprise hydrophilic or hydrophobic components to alter the water transport characteristics of the electrode or portions thereof. Generally, the loading material comprises a binder to bind particulate components of the loading material together and to retain the loading material in the substrate. Polytetra-fluoroethylene is a suitable binder. Additionally, the loading composition comprising the loading material may comprise any standard poreformer that does not interfere with the present method. A preferred poreformer is methylcellulose. The loading composition generally comprises a suitable solvent or diluent such as water.

It has been found that the use of inks having relatively low concentrations of solids (for example, less than 20% solids) in conventional methods can lead to fluid diffusion layers having unacceptable surface roughness. When such inks are dried, they shrink and the dried coating conforms to the rough porous surface. Yet such low-solids inks may be preferable because it is difficult to make and use higher-solids content inks due to the high viscosity of carbons in the inks. Therefore, an advantage of the present methods is the ability to use inks having relatively low concentrations of solids (for example, less than 20%) as the loading composition.

The loading material and the extent to which loading material is adhered to the substrate are selected so that the fluid diffusion layer is suitably, but not overly, porous and permeable to the fuel cell reactants and products, but has adequate electrical conductivity. For example, the completed fluid diffusion layer preferably retains porosity in the range of 60–90%, alternately 70–90%.

Typical average amounts of the loading material in conventional fluid diffusion layers are about 3 mg/cm$^2$, although higher and lower average amounts have been employed. In conventional techniques, higher average amounts of loading material correlated with decreased surface roughness. However, higher average amounts of loading materials also resulted in fluid diffusion layers having lower performance and increased expense. Higher loadings may increase roughness caused by the loading material itself as it shrinks and may crack after drying.

Therefore, another advantage of the present methods is that the fluid diffusion layers may have an average amount of about 3 mg/cm$^2$ or less, more preferably an average amount of about 2.3 mg/cm$^2$ or less, while still having acceptable surface roughness.

In general, the applying step(s) may be performed in any of the known ways of coating, filling or impregnating a substrate with a loading material. A preferred way to apply the loading material to the substrate is by using a knife coater. Another preferred way to apply the loading material is by screen printing the loading material onto the substrate. Another way of applying the loading material is by hand, that is, simply spreading the loading material onto the substrate using a spatula or other tool.

A release material may be employed in the present methods in different manners. The release material may be applied to the substrate after the loading material is applied to the substrate. More preferably, the loading material is applied to the release material, and then the substrate may be applied to the release material so that the loading material is between the release material and the substrate. The loading material may be applied to the release material using a knife coater. The substrate, release material and loading material are then allowed to dry (and optionally are compacted before and/or after drying), and then the release material is removed. The substrate and loading material may then be sintered to form a fluid diffusion layer.

The release material may be any substance that is capable of forming a backing for a substrate during application and compaction yet remains easily removable such as by peeling from the substrate. The release material can be used to form a release material/loading material/substrate sandwich before the sandwich is subjected to compaction and drying. The use of a release material during formation of the fluid diffusion layer may increase electrode and MEA reliability and performance. Suitable release materials include Mylar®, Channeled Resources Blue R/L 41113 release film, and polyethylene coated paper.

The compacting step(s) should be done such that the substrate and loading material are uniformly and evenly subjected to a compressive pressure. The compaction step(s) may be performed with any equipment suitable for applying a desired pressure to a flat surface.

For example, a reciprocating press may be employed to compact the substrate and loading material. The portion of substrate and applied loading material to be compacted is placed between two relatively flat surfaces. After positioning the substrate and loading material, the two surfaces of the reciprocating press come together to compress that portion. A reciprocating press is typically used in a batch-wise fashion, which tends to increase production time. The compacting step(s) are preferably performed at a pressure of about 50 psi (about 350 kPa) or more, alternatively about 200 psi (about 1400 kPa) or less. The compacting may be done for any suitable amount of time, for example, for about 30 seconds or more.

Alternatively, the substrate and the loading material applied thereto can be continuously compacted by applying pressure from one or more pressure-controlled compaction rollers. A preferred way is to compact the substrate, loading material and optionally a separation film, between two compaction rollers at a predetermined pressure. For example, the substrate and loading material may continuously pass between two compaction rollers.

The present methods also generally comprise the step of drying the substrate and loading composition. At various points in the methods, it may be desirable to dry the substrate and loading composition partially or completely. When the substrate and loading composition are dried partially, it means that there remains some moisture that will not be present in the finished fluid diffusion layer. When the substrate and loading material(s) are dried "completely," it means that about the moisture content remaining is approximately that which will be present in the finished fluid diffusion layer. Typically, a finished fluid diffusion layer has a moisture content of about 8% or less, more commonly about 5% or less, at ambient temperature and humidity.

When two applying steps are employed, the method can comprise partially drying or completely drying the substrate and first loading composition before the second applying step. When two applying steps and two compacting steps are employed, the method can comprise partially drying or completely drying the substrate and first loading composition before or after a first compacting step.

The drying step(s) may be performed in any of the known ways. One way is to allow for evaporation at ambient conditions. Another way is to employ an infrared lamp set at a suitable temperature, for example, between about 60° C. and about 80° C. By drying in this fashion, the fluid diffusion layer and applied loading composition may be sufficiently dried after several minutes.

Additionally, the fluid diffusion layers may be sintered (for example, to sinter any polytetrafluoroethylene present) by heat treating at an elevated temperature, such as from about 350° C. to about 420° C., and an electrocatalyst layer may be applied to the fluid diffusion layer to form an electrode.

The present methods may reduce or eliminate the need for post-treatment steps designed to address surface roughness. However, it may be desirable to use the present methods in connection with post-treatment steps, such as scraping with a blade, abrading, or calendaring to further reduce surface roughness of the electrode. For example, other useful steps for reducing roughness involve heating the calendar rollers and/or causing the calendar rollers to slip or skid (by driving at a different speed than the web). This effectively would "iron" the coated surface. These additional post-treatments steps allow the necessary penetration of loading material into the substrate but enough loading material remains on the surface to fill pores, coat fibers, and reduce roughness caused by shrinkage of the loading material during drying.

The foregoing methods may further comprise applying at least one electrocatalyst to the fluid diffusion layer to form an electrode. The loading material or the loading composition may comprise the electrocatalyst.

It is contemplated that the fluid diffusion layers prepared by the present methods may be evaluated for surface roughness by any suitable method for doing so. Those familiar with the art will recognize that the numerical value for average $R_a$ may be dependent upon the method or apparatus used for the measurement. For example it has been found in some cases that average $R_a$ values measured using a Wyko optical surface analyzer were about 1.5 times the values measured using a Surftest stylus. The average $R_a$ values reported herein were determined using a Wyko NT2000 3-D Optical Profiler, but any suitable apparatus or method may be used. The Wyko Optical Profiler is a non-contact optical phase-shift interferometric profiler. Stylus profilers can also be used, but they usually indicate lower values for $R_a$ because they have less resolution for pores. They are also less preferred because they must contact the surface being measured. The detection and quantification of surface roughness may be challenging, as imperfections may only differ a few micrometers from the general plane of the fluid diffusion layer surface.

The present methods have been found effective in reducing average $R_a$ by about 30%. The present methods are also beneficial to reduce the non-random waviness of a substrate. Waviness can be measured by measuring the standard thickness deviation over a sectioned profile of a substrate material. The waviness of an electrode affects the electrode's porosity and/or basis-weight. All other properties being equal, variations in substrate thickness (whether or not with an associated higher basis weight) will change the amounts of reactant and water diffusion to the catalyst and extraction rate of product water. This will change the cell over potential at the associated area of the anode and cathode, and will thus change the voltage. Thus, a variation in electrode thickness will increase cell-to-cell and within-cell voltage variability in a fuel cell stack. This will reduce the ability of the fuel cell stack to be optimized for any one or combination of reactant stoichiometries, pressures, temperatures, and low-cost materials. As a result, total stack power output available at any given condition would be reduced to prevent lower performing cells from dropping into reversal.

The fluid diffusion layer may be visually inspected microscopically and/or photographically and may be analyzed qualitatively or quantitatively. The surface roughness of the fluid diffusion layer may be measured using an optical surface analyzer. Such an analyzer can provide quantitative measurements and representative profiles of the variations on the surface. Alternatively or additionally, an electrode, fluid diffusion layer, or substrate may be compressed against a sheet capable of being deformed by the surface, so as to form a "negative." A Grafoil™ sheet will form a suitable negative. An optical surface analyzer can be used to provide quantitative measurements of the surface of the negative. This is advantageous in that the use of the negative provides a measure of surface roughness under pressure. The electrodes are under pressure when employed in electrochemical fuel cell stacks.

As yet another aspect, a method for evaluating surface roughness of a fluid diffusion layer is provided. The method comprises providing a fluid diffusion layer and an electrocatalyst. The method also comprises providing an ion exchange membrane. The fluid diffusion layer is compressed against the ion exchange membrane to form an assembly with the electrocatalyst disposed as a layer between them. The assembly has first and second oppositely facing major planar surfaces. The method next comprises exposing the first major planar surface of the assembly to a first reactant fluid while exposing the second major planar surface of the assembly to a second reactant fluid. When no leak is present in the membrane, the first and second reactant fluids are substantially fluidly isolated from each other by the assembly. When at least one leak is present in the membrane, the first reactant fluid and the second reactant fluid contact each other, and they exothermically react upon contact to generate heat. The method comprises detecting infrared hot-spots corresponding to the exothermically generated heat, and calculating an average $R_a$ of the fluid diffusion layer based upon the detecting of the infrared hot-spots and a known correlation between average $R_a$ and infrared hot-spots.

Detection of hot-spots is particularly suitable as a method for the detection and location of transfer leaks in a membrane. Further details and equipment for the detection of hot-spots are disclosed in U.S. Pat. No. 5,763,765.

The method may further comprise the step of rejecting the fluid diffusion layer when the calculated average $R_a$ is excessive, such as, for example, greater than 13 µm. This method is well-suited to be part of a quality control technique for fluid diffusion layers and/or MEAs.

The method may further comprise the step of compressing a second fluid diffusion layer against the second surface of the membrane, whereby a membrane electrode assembly is formed, prior to exposing the assembly to the first and second reactant gases.

Some substrate materials such as Toray carbon fiber paper are less likely to exhibit hot-spots when employed as electrodes in operating MEAs. While the absence of hot-spots may indicate that there are no transfer leaks present, perhaps due to low surface roughness, it may indicate that such leaks are not detectable by the thermal detector. One reason why the hot-spots may not be detectable is the good thermal conductivity of the carbon fiber paper. When using thermal imaging to detect leaks, an effort should be made to determine whether thermal imaging would work for that purpose with that substrate.

Test batches of Toray (one batch) and SGL substrates (two batches) in uncompressed and compressed states (to simulate bonding or stack compression conditions) were measured using a three dimensional optical surface imaging technique using a Wyko NT2000 3-D Optical Profiler apparatus. The Wyko apparatus was used to measure an average $R_a$ value of one or more 0.5 $cm^2$ portions of a substrate, fluid diffusion layer or electrode surface or of a substrate, fluid diffusion layer or electrode impression on a compressible material. The surface profile was measured in the cross-direction of any observed fiber orientation of the substrate. Stylus profilers can also be used; however, they usually record a lower average $R_a$ value as their pore resolution tends to be lower. The surface roughness of the measured portion is considered to be indicative of the average $R_a$ of the entire substrate/fluid diffusion layer/electrode; variations of only about 2 µm were found between measured portions of the same material.

From the examined test specimens, the SGL substrate was found to have an average $R_a$ greater than Toray by about 100–140%. An electrode having a SGL substrate that was compressed at 300 pounds per square inch (2068 kPa) was found to have $R_a$ surface values about 170% greater than a similarly compressed electrode having a Toray substrate.

Surface peaks as high as 115 µm were observed in the SGL substrates; these peaks were usually tangled clumps of fiber and binder. The following table provides an overview of the measured substrates and their average $R_a$ values:

TABLE 1

|  | average $R_a$ (µm), no compression | average $R_a$ (µm), 300 psi compression |
|---|---|---|
| Toray H060 | 14.4 | 10.6 |
| Toray coated cathode | 6.1 | 6.2 |
| SGL (batch 1) | 26 | 17 |
| SGL (batch 2) | 32 | 19 |
| SGL coated anode (batch 1) | 17.8 | 16.8 |

The uncompressed average $R_a$ values in the table above were measured directly on the substrates whereas the average $R_a$ values under 300 psi compression were measured from Grafoil negatives.

Coating the smaller pored, less rough Toray substrate with a carbon-containing sublayer and catalyst ("bi-layer coat") resulted in a significantly smoother surface. In contrast, there was a less significant decrease in the roughness of the SGL substrate after it was coated. The greater relative average $R_a$ decrease in the Toray is theorized to be caused in part by the greater ability of the carbon sublayer and catalyst to coat the surface and fill the pores of the substrate; in contrast, the sublayer coatings may not fill the larger pores of the SGL as effectively as those of the Toray substrate. Coating the SGL substrate does not appear to significantly reduce average surface roughness under pressure; it appeared that parts of the substrate may have broken through the coating during compression. In contrast, it appeared the carbon and catalyst sublayers in the Toray substrate still maintained their integrity during bonding conditions and under stack compression. It appeared that the smaller pores and more uniform basis weight of the Toray substrate enabled the coating to maintain its integrity under pressure.

Figure 1B:
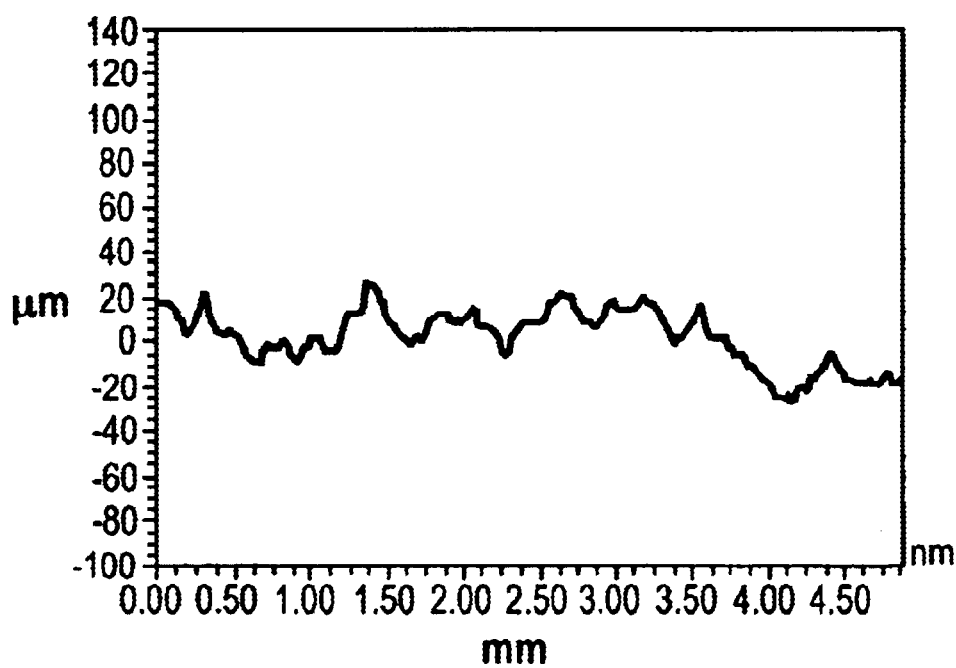

FIGS. 1(a) and 1(b) are optical analysis profiles from a Wyko optical surface analyzer of the surface impressions from two fluid diffusion layers on a Grafoil™ negative at 300 psi. FIG. 1(a) is from a fluid diffusion layer comprising a substrate with a loading material applied thereto in a single applying step followed by compacting and drying, to produce a fluid diffusion layer with an average amount of loading material of 4 $mg/cm^2$. FIG. 1(b) is from a fluid diffusion layer comprising a substrate made according to one of the present methods, comprising a substrate with a loading material applied thereto in an average amount of loading material of 3 $mg/cm^2$. The loading material was applied in two separate applying steps, with a compacting step after each.

More particularly, the fluid diffusion layer represented in FIG. 1(b) was prepared using the following steps. A substrate had loading material applied to it in a process comprising two applying steps, the first applying step being sufficient for an average amount of about 2 $mg/cm^2$ and the second applying step being sufficient for an average amount of about 1 $mg/cm^2$. The substrate and loading material were compressed at about 100–200 psi after each applying step. The substrate and loading material were dried after the second compacting step by allowing evaporation under ambient conditions overnight.

It has been discovered that a correlation exists between average $R_a$ for an electrode or fluid diffusion layer and the results of infrared analysis of hot-spots on that electrode or fluid diffusion layer. In particular, the number of hot-spots correlates linearly to average $R_a$. The detection of hot-spots may be a good indicator for the early detection and quantification of internal transfer leaks in MEAs during operation. Therefore, it has been found that a lower number of hot-spots are desirable, and efforts have been made to attempt to lower or eliminate hot-spots occurring for tested fluid diffusion layers.

In particular, it has been desirable to make efforts to reduce or eliminate the number of infrared hot-spots occurring for tested fluid diffusion layers comprising substrates of lower cost carbon fiber nonwoven webs, such as hydroentangled nonwoven ("HENW") from SGL and/or carbon fiber nonwoven webs ("CFNW") from Technical Fiber Products, Inc. Among the techniques that have been employed in order to reduce the number of hot-spots are increasing the amount of sublayer loading of electrocatalysts in binder, reducing the bonding temperature of the electrode to the membrane, and reducing the bonding pressure of the electrode to the membrane. However, these strategies tend to result in lower MEA stability, or a higher tendency for delamination, as well as a lower cell voltage and power density.

Other variables that may impact surface roughness and perforations or leaks include abrading the substrate before or after the loading material is adhered, pre-compaction of the substrate before the loading material is adhered, the side on which the loading material is applied, fill loading, surface loading, and bonding with Grafoil™ backing.

Average $R_a$ values of the fluid diffusion layer, both measured directly with the Surftest and measured on imprints into Grafoil™ by the Wyko optical surface analyzer, correlate linearly with the infrared hot-spots when those fluid diffusion layers are analyzed according to the methods described herein and in U.S. Pat. No. 5,763,765. A correlation has been observed between infrared hot-spots and deep pores or depressions on the fluid diffusion electrode, indicating that leaks may be caused not only by perforation but also by tensile or compressive stresses leading to excessive thinning of the membrane. Peaks in the electrode surface may cause leaks by penetrating the membrane. Pores or depressions may cause leaks as compressive stresses cause the membrane to flow into pores or depressions during MEA bonding or operation. This correlation may be employed as part of a quality control and diagnostic technique for fluid diffusion layers and electrodes employed in electrochemical cells.

EXAMPLES

In the examples and comparative examples which follow, a carbon fiber nonwoven web sold by SGL under the name SiGRACET™ was used as the substrate after being pre-treated with polytetrafluoroethylene in the following manner. The SiGRACET™ substrates were pre-treated by soaking in a diluted solution of DuPont Polytetrafluoroethylene (PTFE) homopolymer Product 30B for 60 seconds, then were allowed to dry overnight at ambient room conditions, resulting in an average amount of about 0.6 mg/cm² PTFE in the substrates. The original basis weight of the SiGRACET™ substrate was about 6.62 mg/cm².

For each of the examples and the comparative examples, the loading composition comprised an emulsified mixture of (by solids weight) 37% A99 Graphite from Asbury (graphite particles), 37% Shawinigan Carbon from Chevron (carbon black), 13% DuPont Polytetrafluoroethylene (PTFE) homopolymer Product 30B (binder) and 13% Methylcellulose from Sigma Aldrich (poreformer). The solids content of the loading composition was 15% (by weight).

Comparative Examples

For comparison, four fluid diffusion layers having different average amounts of loading material were prepared in the following manner. The average $R_a$ of these four comparative fluid diffusion layers is plotted in each of FIGS. 2, 3 and 4 for comparative effect. In these Figures and in FIG. 5, all the average $R_a$ values were determined from optical analyses of Grafoil™ negatives.

The loading composition was applied to the four substrates using a RK-Print Coat K-coater (a knife coater), with blade gaps of 7, 10, 16 and 40 thousandths of an inch, respectively, for the four substrates. Sheets of Vitafilm (PVC film food wrap) from Hundsman Film Products of Canada Limited were then laid to the coated surfaces, blotter paper supported the back surfaces, and the assemblies were then compacted at 200 psi for 30 seconds. The Vitafilm sheets were immediately removed and the substrates were then allowed to dry overnight at ambient room conditions. The coated substrates were sintered at 400° C. for a minimum of 10 minutes to complete the fluid diffusion layer.

Figure 2:
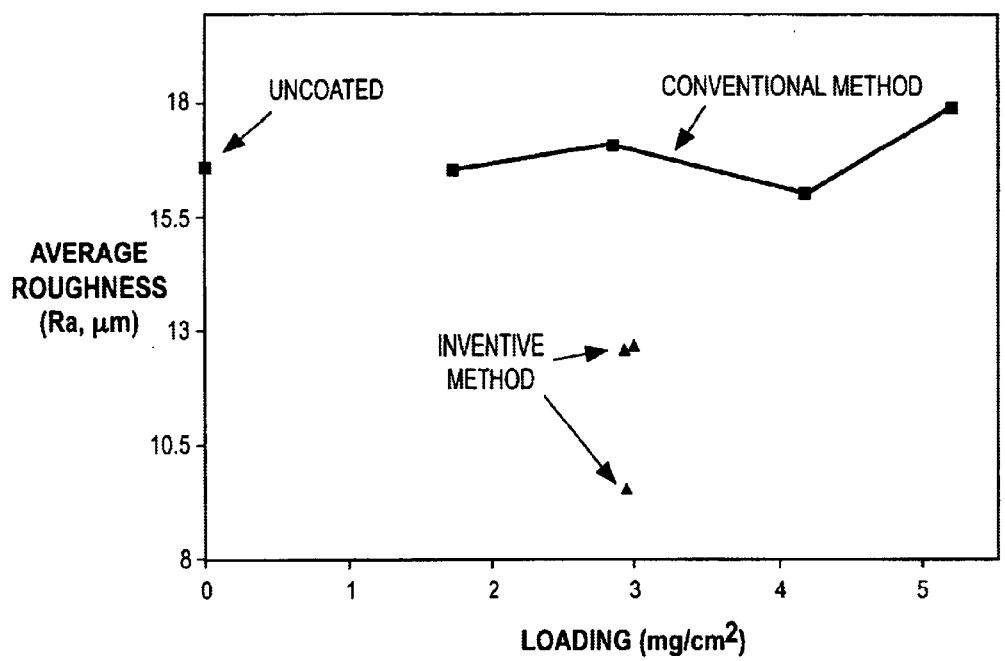
FIG. 2 is a graph showing average $R_a$ values of three fluid diffusion layers made according to one aspect of the present method, plotted over the average amount of loading material in the fluid diffusion layer.
Figure 3:
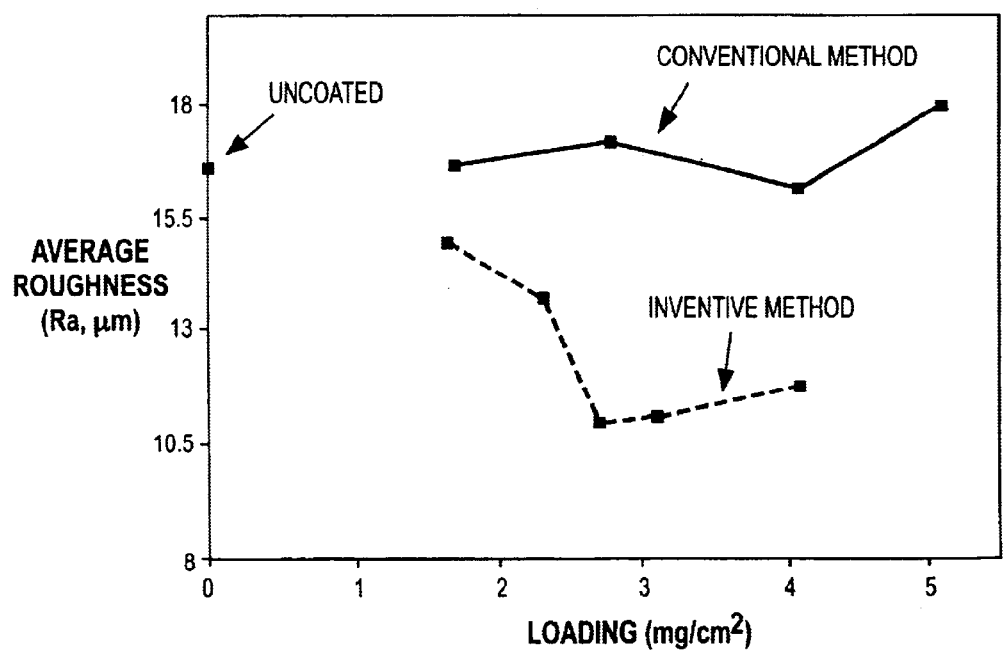
FIG. 3 is a graph showing average $R_a$ values of five fluid diffusion layers made according to another aspect of the present method, plotted over the average amount of loading material in the fluid diffusion layer.
Figure 4:
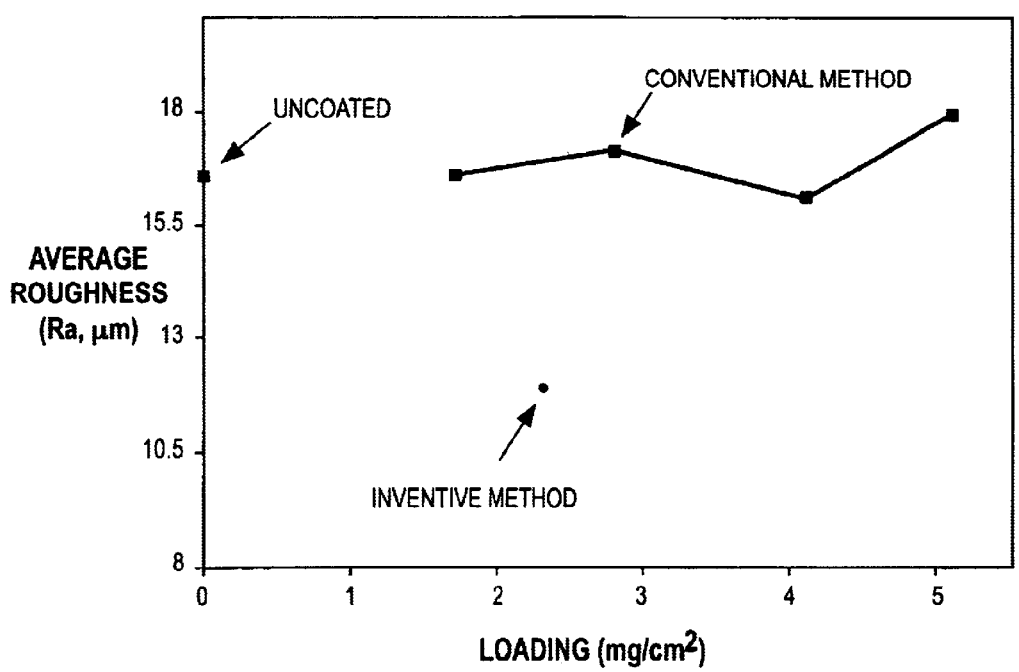
FIG. 4 is a graph showing the average $R_a$ value of a fluid diffusion layer made according to yet another aspect of the present method, plotted over the average amount of loading material in the fluid diffusion layer.

The average amounts of loading material for the four fluid diffusion layers were 1.7 mg/cm², 2.8 mg/cm², 4.1 mg/cm² and 5.1 mg/cm², respectively. Average $R_a$ values are shown in FIGS. 2–4. The average $R_a$ values for the fluid diffusion layers made in this manner were greater than about 15.5 μm. The average $R_a$ for the fluid diffusion layers were about the same as the original substrate, indicating that the application of loading material in this manner did not significantly reduce surface roughness.

Example 1

Three fluid diffusion layers were prepared in the following manner, which includes two separate steps of applying loading composition. Three pre-treated SiGRACET™ carbon fiber nonwoven webs were used as the substrates.

The same loading composition described above was applied to the three substrates by coating with a RK-Print Coat K-coater with a blade gap of 17 thousandths of an inch. Sheets of Vitafilm were then laid to the coated surfaces, blotter papers supported the back surfaces, and the assemblies were then compacted at 100 psi for 30 seconds. The Vitafilm sheets were immediately removed and the compressed substrates and loading composition applied thereto were then allowed to dry overnight at ambient room conditions.

The average amount of loading material for each was generally about 2 mg/cm². The substrates were coated a second time with the same loading composition except that a blade gap of 7 thousandths of an inch was used, resulting in less loading composition being applied. Sheets of Vitafilm were then laid to the coated surfaces, blotter paper supported the back surfaces, and the assemblies were again compacted at 100 psi for 30 seconds. The Vitafilm sheets were immediately removed, and the substrates and loading composition applied thereto were then allowed to dry overnight at ambient room conditions. The average amount of additional loading material for each was generally about 1 mg/cm². The substrates were sintered at 400° C. for a minimum of 10 minutes to complete the fluid diffusion layers. Average $R_a$ values for these fluid diffusion layers are shown in FIG. 2. The average $R_a$ values for the fluid diffusion layers made in this manner were less than about 13 μm, representing a significant improvement over the comparative examples.

Example 2

Five fluid diffusion layers were prepared in the following manner, which includes the steps of applying loading composition, partially drying, compacting, then further drying.

The substrates were coated on a RK-Print Coat K-coater with blade gaps of 15, 20, 25, 30 and 40 thousandths of an inch, respectively. The substrates and loading composition applied thereto were removed from the K-coater and allowed to dry on a rack at ambient conditions until about 50% of the loading composition moisture had evaporated (usually 40 minutes). Sheets of Vitafilm were then laid to the coated surfaces, blotter paper supported the back surfaces, and the assemblies were then compacted at 100 psi for 30 seconds. The Vitafilm sheets were immediately removed and the substrates and loading composition applied thereto were then allowed to dry overnight at ambient room conditions. The substrates and loading material were sintered at 400° C. for a minimum of 10 minutes to complete the fluid diffusion layers.

The average amounts of loading materials for the fluid diffusion layers were 1.63 mg/cm$^2$, 2.32 mg/cm$^2$, 2.7 mg/cm$^2$, 3.1 mg/cm$^2$ and 4.1 mg/cm$^2$. The average $R_a$ values of examples prepared with the improved process are shown in FIG. 3. The average $R_a$ for the fluid diffusion layers made in this manner were less than about 15.5 μm, and when the loading was greater than 2.5 mg/cm$^2$, the average $R_a$ was less than 13 μm, again representing a significant improvement over the comparative examples.

Example 3

A fluid diffusion layer was prepared in the following manner, which includes the steps of applying loading composition to release material, applying the release material to the substrate such that the loading composition is between them, compacting, and drying.

As the release material, Channeled Resources Blue R/L 41113 release film was used. The release film was coated with the same loading composition described above at 20 thousandths of an inch blade gap using a RK-Print Coat K-coater.

A pre-treated SiGRACET™ substrate was laid to the coated surface of the release film. A blotter paper was laid to the other side of the substrate, and the assembly was then compacted at 50 psi for 30 seconds. The substrate, release film and loading composition were then allowed to dry overnight at ambient room conditions. On the following day, the release film was peeled off the surface, and the substrate and loading material applied thereto were sintered at 400° C. for a minimum of 10 minutes to complete the GDL. The final average amount of loading material was 2.3 mg/cm$^2$. The surface roughness of this example prepared with the improved process was about 11.7 μm as shown in FIG. 4, again representing an improvement over the comparative examples.

While the preceding methods may be used to reduce surface roughness of substrate batches with unacceptable surface roughness, it may still be desirable to evaluate a sample of a substrate batch for surface roughness before the entire batch is made into fluid diffusion layers and combined in membrane electrode assemblies by testing the surface roughness, such as by optical analysis of the surface. If the average $R_a$ of the substrate is excessive, one may decide to discard the substrate batch. Alternatively, depending on the likelihood of having manufactured fluid diffusion layers with unacceptable roughness, one may instead evaluate fluid diffusion layers and screen out those with excessive surface roughness.

Figure 5:
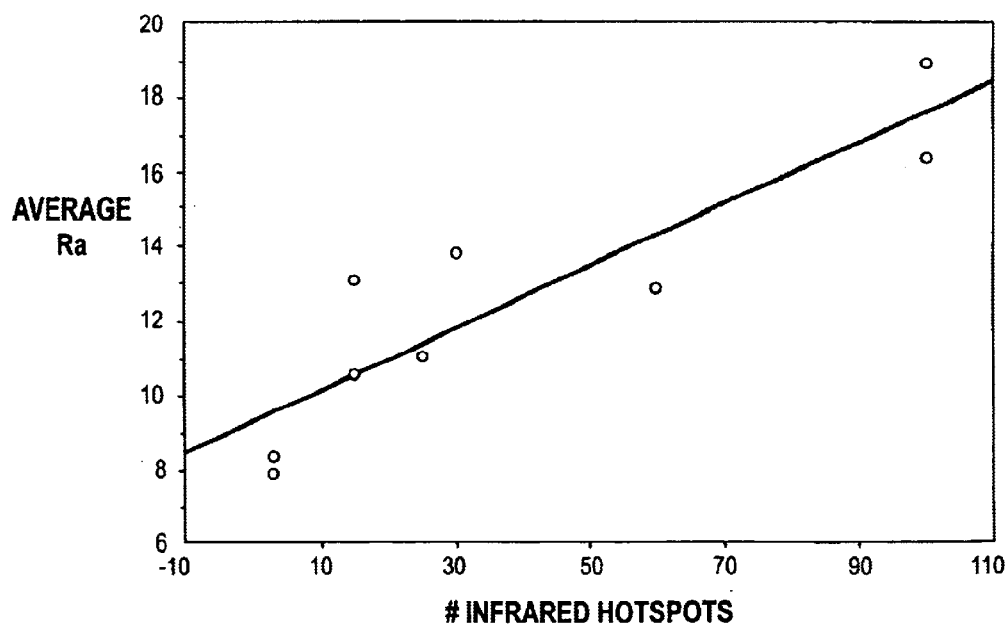
FIG. 5 is a graph illustrating a relationship between the occurrence of infrared hot-spots detected for a tested electrode and the average $R_a$ of that electrode, as determined using a Wyko optical surface analyzer.

FIG. 5 is a graph showing a correlation between infrared hot-spots detected for membrane electrode assemblies comprising electrodes and the average $R_a$ values of those electrodes as determined using a Wyko optical surface analyzer. Both electrodes in each membrane electrode assembly had the same surface roughness since both cathode and anode were made from the same piece of substrate material. However, these pieces of substrate material were obtained from different batches and in certain cases were treated in various ways, which accounts for the variety in average $R_a$ values.

An observed correlation was that a higher average $R_a$ for an electrode correlated to more frequent observation of hot-spots in that electrode. As shown in FIG. 5, there is a substantially linear relationship between the number of infrared hot-spots and the average $R_a$ of the electrode. Thus, average $R_a$ may be used to predict the number of infrared hot-spots.

The present methods increase MEA reliability by modifying the surface effects of fluid diffusion layers that can lead to infrared hot-spots or electric shorts, and reduce the thickness variations in electrodes and MEAS. Performance is also improved by allowing a reduction in average amounts of loading material while facilitating lower surface roughness.

While particular elements, embodiments, and applications of the present invention have been shown and described, it will be understood, of course, that the invention is not limited thereto since modifications may be made by those skilled in the art, particularly in light of the foregoing teachings. It is therefore contemplated that the appended claims cover such modifications as incorporate those features, which come within the scope of the invention.

What is claimed is:

1. A method of making a fluid diffusion layer comprising a substrate and a loading material adhered to the substrate, wherein the loading material is adhered to the substrate by the steps of:
   (a) applying a first loading composition comprising a first portion of the loading material to the substrate in a first applying step; and
   (b) applying a second loading composition comprising a second portion of the loading material to the substrate in a second applying step.

2. The method of claim 1 wherein the method comprises compacting the substrate and the second portion of loading material applied thereto after the second applying step.

3. The method of claim 2 wherein the method comprises drying the substrate and the first loading composition applied thereto, and thereafter compacting the substrate and the first loading material applied thereto.

4. The method of claim 1 wherein the method comprises compacting the substrate and the first portion of the loading material applied thereto between steps (a) and (b).

5. The method of claim 4 wherein the method comprises at least partially drying the substrate and the first loading composition applied thereto before compacting.

6. The method of claim 1 wherein the method further comprises compacting the substrate and the first loading composition, and thereafter drying the substrate and the first loading composition applied thereto before the second applying step.

7. The method of claim 1 wherein the loading material is adhered to the substrate in an average amount of about 3 mg/cm$^2$ or less.

8. The method of claim 1 wherein the loading material is adhered to the substrate in an average amount of about 2.3 mg/cm$^2$ or less.

9. The method of claim 1 wherein the average $R_a$ of the fluid diffusion layer is less than about 13 μm.

10. The method of claim 1 wherein the substrate is selected from the group consisting of carbon fiber nonwoven substrates and carbon paper substrates.

11. The method of claim 1 wherein the substrate is a carbon fiber nonwoven web.

12. The method of claim 1 wherein the substrate is a significantly porous substrate.

13. The method of claim 1 wherein the average $R_a$ of the substrate prior to step (a) is about 16 µm or greater.

14. The method of claim 1 further comprising the steps of treating the substrate with a hydrophobic polymer before step (a), and sintering the treated substrate only after step (a).

15. The method of claim 1 wherein about 50% or more of the total loading material is applied in the first applying step.

16. The method of claim 1 wherein about 75% or less of the total loading material is applied in the first applying step.

17. The method of claim 1 wherein about two-thirds of the total loading material is applied in the first applying step.

18. The method of claim 1 wherein about 25% or more of the total loading material is applied in the second applying step.

19. The method of claim 1 wherein about 50% or less of the total loading material is applied in the second applying step.

20. The method of claim 1 wherein about one-third of the total loading material is applied in the second applying step.

21. The method of claim 1 further comprising the step of compacting the substrate and the loading material applied thereto at a pressure in the range of from about 50 psi to about 200 psi.

22. The method of claim 1 wherein the first portion of loading material and the second portion of the loading material comprise the same loading material.

23. The method of claim 1 wherein the first loading composition and the second loading composition are substantially identical.

24. The method of claim 1 wherein the first loading composition and the second loading composition each has a solids content below 20 percent.

25. The method of claim 1 wherein at least one of the first applying step and the second applying step comprises applying loading material to a release material and contacting the substrate and the release material such that the loading material is disposed between the substrate and the release material.

26. The method of claim 1 further comprising the step of applying an electrocatalyst to the fluid diffusion layer to form an electrode.

27. The method of claim 26 wherein at least one of the first loading composition and the second loading composition comprises the electrocatalyst.

28. A method for making a fluid diffusion layer comprising a substrate and at least one loading material adhered to the substrate, wherein the loading material is adhered to the substrate by the steps of:
   (a) applying a loading composition to the substrate wherein the loading composition comprises the loading material,
   (b) partially drying the substrate and the loading composition applied thereto in a first drying step,
   (c) compacting the substrate and the loading material applied thereto in a compacting step, and
   (d) further drying the substrate and the loading material applied thereto in a second drying step.

29. The method of claim 28 wherein step (b) comprises drying the loading composition to a moisture content of from about 30% to about 70%.

30. The method of claim 28 wherein the loading material is adhered to the substrate in an average amount of about 3 mg/cm² or less.

31. The method of claim 28 wherein the loading material is adhered to the substrate in an average amount of about 2.3 mg/cm² or less.

32. The method of claim 28 wherein the average $R_a$ of the fluid diffusion layer is less than about 13 µm.

33. The method of claim 28 wherein the substrate is selected from the group consisting of carbon fiber nonwoven substrates and carbon paper substrates.

34. The method of claim 28 wherein the substrate is a carbon fiber nonwoven web.

35. The method of claim 28 wherein the substrate is a significantly porous substrate.

36. The method of claim 28 wherein the average $R_a$ of the substrate prior to step (a) is about 16 µm or greater.

37. The method of claim 28, further comprising the steps of treating the substrate with a hydrophobic polymer before step (a) and sintering the treated substrate only after step (a).

38. The method of claim 28 wherein the compacting step comprises compacting at a pressure in the range of from about 50 psi to about 200 psi.

39. The method of claim 28 wherein the loading composition has a solids content below 20 percent.

40. The method of claim 28, further comprising the step of applying an electrocatalyst to the fluid diffusion layer to form an electrode.

41. The method of claim 40 wherein the loading composition comprises the electrocatalyst.

42. A method for making a fluid diffusion layer comprising a substrate and a loading material adhered to the substrate, wherein the method comprises providing a release material, and the method comprises the steps of:
   (a) applying a loading composition comprising the loading material to at least one of the substrate and the release material so that a coated surface is formed;
   (b) contacting the substrate and the release material so that the coated surface is disposed between the substrate and the release material;
   (c) compacting the substrate, the release material, and the applied loading composition in a compacting step, and
   (d) drying the substrate, the release material, and the applied loading composition in a drying step, and
   (e) removing the release material from the substrate and the loading material.

43. The method of claim 42 wherein step (a) comprises applying the loading composition to the release material.

44. The method of claim 42 wherein step (a) comprises applying the loading composition to the substrate.

45. The method of claim 42 further comprising the step of partially drying the substrate, the release material and the applied loading composition after step (b), before step (c).

46. The method of claim 42 wherein the loading material is adhered to the substrate in an average amount of about 3 mg/cm² or less.

47. The method of claim 42 wherein the loading material is adhered to the substrate in an average amount of about 2.3 mg/cm² or less.

48. The method of claim 42 wherein the average $R_a$ of the fluid diffusion layer is less than about 13 µm.

49. The method of claim 42 wherein the substrate is selected from the group consisting of carbon fiber nonwoven substrates and carbon paper substrates.

50. The method of claim 42 wherein the substrate is a carbon fiber nonwoven web.

51. The method of claim 42 wherein the substrate is a significantly porous substrate.

52. The method of claim 42 wherein the average $R_a$ of the substrate prior to step (a) is about 16 μm or greater.

53. The method of claim 42 wherein the compacting step comprises compacting at a pressure in the range of from about 50 psi to about 200 psi.

54. The method of claim 42 wherein the loading composition has a solids content below 20 percent.

55. The method of claim 42 further comprising the step of applying an electrocatalyst to the fluid diffusion layer to form an electrode.

56. The method of claim 55 wherein the loading composition comprises the electrocatalyst.

* * * * *